Oct. 31, 1939.　　　　H. R. GOODALE　　　2,177,649
VALVE
Filed March 18, 1933
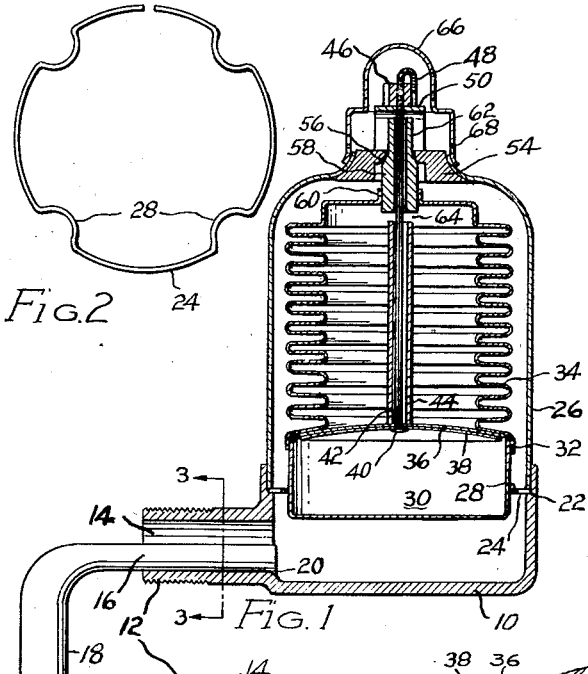
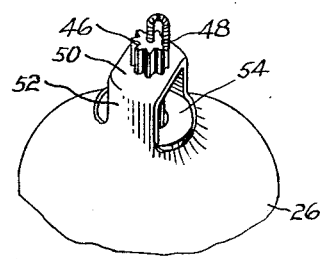
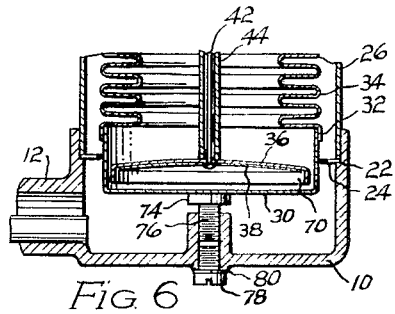
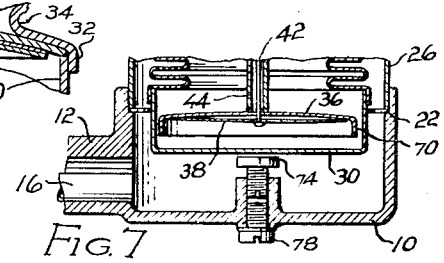
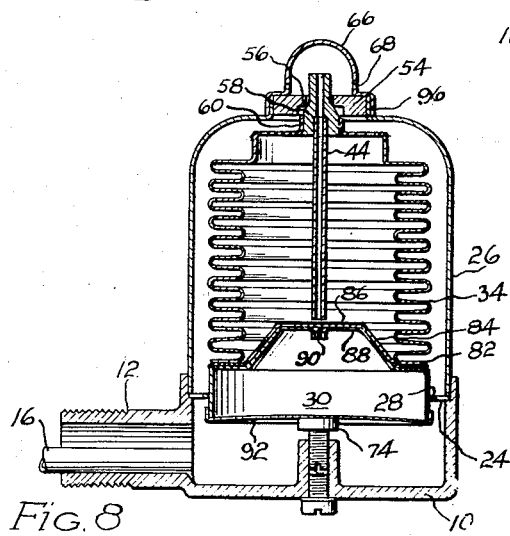
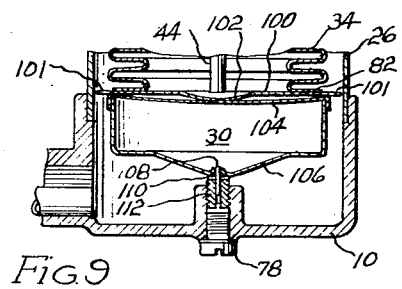
INVENTOR.
HAROLD R. GOODALE,
BY Romeyn A. Spare
HIS ATTORNEY.

Patented Oct. 31, 1939

2,177,649

UNITED STATES PATENT OFFICE 2,177,649

VALVE

Harold R. Goodale, Bristol, Conn.

Application March 18, 1933, Serial No. 661,604

15 Claims. (Cl. 236—62)

This invention relates to valves and comprises all of the features of novelty herein disclosed. An object of the invention is to provide an improved valve adapted more especially for application to steam radiators to expel and/or exclude air and to retain steam. Another object is to provide an air valve with a bellows internally open to the atmosphere and having improved means to prevent excessive collapse. Another object is to provide a valve with an improved thermostatic control and wherein the thermostatic device is housed and protected from corrosion. Still another object is to provide an improved drain pipe for air valves. Yet another object is to provide a simple, low-cost, easily assembled valve.

To these ends and also to improve generally upon devices of this character, the invention consists in the various matters hereinafter described and claimed. In its broader aspects, the invention is not necessarily limited to the specific constructions selected for mere illustrative purposes in the accompanying drawing in which:

Fig. 1 is a vertical sectional view of the preferred valve.

Fig. 2 is a plan view of a centering and guiding ring.

Fig. 3 is a sectional view on the line 3—3 of Fig. 1.

Fig. 4 is a perspective view of certain details.

Fig. 5 is a sectional view of a bimetal snap-disc and associated parts, larger than natural size.

Fig. 6 is a sectional view of a modification of Fig. 1.

Fig. 7 is a sectional view showing the parts of Fig. 6 in another position.

Fig. 8 is a sectional view of another form of valve.

Fig. 9 is a sectional view of a modification of Fig. 8.

Referring to Fig. 1, the valve-casing base 10 has a projecting threaded portion or plug 12 to screw into the usual tapped opening in a radiator. A round bore 14 in the plug 12 receives a bent drain pipe having a semi-cylindrical section 16 which merges with a round section 18. The drain pipe has an angular bend which facilitates insertion into the radiator opening in advance of the plug 12, the section 16 being free to slide endwise with respect to the bore 14 but is prevented from coming out of the bore by means of a little enlargement 20 which may conveniently be a burr or a bit of solder applied to the section 16 from the inside of the base 10. The semi-cylindrical section 16 provides a slidable and rotatable but non-tilting drain attachment which will drain condensed moisture from the base of the valve while permitting entrance of steam or air to the valve through the unobstructed upper half of the bore 14. The fit of the section 16 in the bore 14 avoids any of the usual capillary spaces around the pipe, such as occurs with a round pipe in a round bore of larger diameter, yet the valve will turn freely on the pipe section 16 when the plug 12 is screwed home.

The valve-casing base 10 has a shouldered recess 22 to receive a split guiding and centering ring 24 which is held against the shoulder by an upper valve casing 26. The split ring, as appears best in Fig. 2, has a series of bends 28 adapted to loosely engage and guide the cylindrical side wall of a cup-shaped base member 30 which forms a bottom extension of an elastic container 34 herein shown as a bellows. A flange 32 on the bellows is soldered to the outer side wall of the member 30. A reinforcing plate 36, herein shown as a dished washer, is confined between the rim of the member 30 and the lower convolution of the bellows. Inside of the elastic container and arranged below the reinforcing plate 36 is a thermostatic snap member 38, preferably in the form of a bimetal disc composed of two selected metals (see Fig. 5) having different co-efficients of expansion and so made that the disc will snap over at a selected temperature from concave in one direction to concave in the opposite direction. In the present instance, the bimetal disc is selected to snap back and forth at a temperature less than the boiling point of water, say about 180° F. In Fig. 1 the effect of snapping over will be to lift certain supported parts because the center of the bimetal disc is fixed in position while its rim rises as will appear.

The disc 38 is centrally pierced and is suspended on the headed end 40 of a rod 42 which passes freely upwards through the stiffening plate 36 and through a sleeve 44 which rests by gravity on the plate 36. The upper end of the rod 42 is adjustably threaded in a nut 46 which is externally grooved to receive and lock the bent over end of the threaded rod as indicated at 48. The nut 46 rests on a platform 50 joined by uprights 52 to the casing 26. The platform is conveniently made by cutting out portions of the upper dome-like end of the casing 26. A seat member 54 is soldered to the casing 26 and is provided with a rounded seat 56 for contact with a self-aligning conical surface on a hollow valve 58 to which a flange 60 on the upper end of the bellows is soldered. The valve is hollow to permit passage of the rod 42 and to also admit atmospheric air to the bellows. To aid in excluding moisture from the bellows, the valve 58 is extended upwardly through the seat member 54 as indicated at 62. A space 64 for lost motion occurs between the valve 58 and the sleeve 44 when the valve is cold but, under certain conditions, as will appear, the sleeve 44 will engage the valve. A cap 66 encloses the upper parts of the valve but its interior is open to the atmosphere at the openings 68.

Assuming the valve of Fig. 1 has just been attached to a cold radiator, the interior parts are suspended on the rod 42 which is so adjusted in the nut 46 that the bellows 34 (which also acts as a spring) will exert a light upward pressure on the valve 58 and hold it lightly seated. When the radiator is heated, the rising temperature causes the air initially in the system to expand and to create pressure on the bellows 34 thereby collapsing it. Since the bottom member 30 of the bellows is firmly supported by the disc 38 and the rod 42, the bellows collapses downwardly from the top and carries the valve 58 away from its seat. This lets the air escape or some of it until the pressure drops and lets the bellows expand to close the valve again. Rising temperature again increases the pressure and the valve opens again, and this opening and closing of the valve may be repeated a number of times until all of the air is driven from the system and replaced by steam. When, however, the temperature in the valve casing reaches that selected for the action of the bimetal snap-disc 38, such disc snaps over and becomes concave upward instead of concave downward. The center of the disc 38 hangs in its fixed location on the rod 42 but the rim of the disc rises and lifts the plate 36, the bellows 34, the bottom extension 30, the sleeve 44, and the latter engages and transmits closing pressure to the valve 58. The valve thereupon becomes more firmly seated and prevents escape of steam. The tendency of steam pressure to collapse the bellows is resisted by the sleeve 44 which is interposed between the valve 58 and the stiffening plate 36, and the latter being connected at its rim to the member 30. When the system cools down, the snap disc 38 snaps back to the first position but the valve remains closed due to the original adjustment of the expansive tendency of the bellows. A lowering of the temperature is accompanied by condensation of steam and water vapor which makes a partial vacuum in the valve casing. This has a tendency to expand the bellows because of the maintenance of atmospheric pressure within the bellows at all times. Such tendency to expand is however resisted in one direction by the valve engaging its seat and in the opposite direction by the stiffening plate 36 and the tension on the rod 42, thus avoiding damage to the thin snap disc 38. Should water enter the valve casing from the radiator, the valve will close tighter because the bellows and its bottom extension 30 will act as a float and rise, the plate 36 and sleeve 44 preventing undue collapse. The bottom of the member 30 is spaced sufficiently above the bottom of the valve base 10 to permit the drain pipe to shift inwardly when the valve is installed.

In the modification of Figs. 6 and 7, the plate 36 is free from the bellows and from the member 30, and is provided with a stop flange 70 spaced a little way above the bottom of member 30. The latter rests initially upon the head of an adjusting screw 76 threaded in a boss of the valve base 10. A removable screw 78 provides for access to the adjusting screw 76, and an interposed gasket 80 prevents leakage at the threads. The screw 76 is used to adjust the member 30 initially so that the spring action of the bellows will press the valve 58 lightly against its seat. The bellows will collapse to open the valve to let out air as in the preceding form. When the bimetal disc 38 is heated and snaps over as indicated in Fig. 7, the stiffening plate 36 and the sleeve 44 are lifted to hold the valve closed against escape of steam. Such steam creates a pressure tending to collapse the bellows which, being connected to the seated valve, will thus collapse upwardly and lift the bottom member 30 from the abutment head 74. Such collapse by steam (or by water entering the valve casing) is limited by engagement of the member 30 with the flange 70, the plate 36 being stiff enough to transfer such pressure to the sleeve 44 and valve 58. When, upon cooling of the system the bimetal disc snaps back again, the creation of a partial vacuum expands the bellows and the bottom member 30 again rests on the head 74 and limits such expansion.

In the modification of Fig. 8, the bottom convolution or flange 82 of the bellows 34 is soldered to a flange on a dished plate having a conical wall 84 and a center portion 86 spaced a little way from a hollow stem or sleeve 44 which is secured to the valve 58. The member 30 has a projecting portion 88 seated in the dished plate and centering the bellows. The member 30 has a plug 90 closing an opening through which a volatile fluid is inserted. The bottom wall of the member 30 has a snap disc or diaphragm 92 resting on the head 74, such diaphragm being concave downwardly when the valve is cold and the valve 58 being lightly seated by the spring in the bellows. The casing 26 has a flange 96 soldered to the seat plate 54. When the system begins to heat, the increasing pressure of air collapses the bellows and opens the valve as in the other forms. When a predetermined temperature is reached, the volatile fluid in the member 30 becomes vaporized and the diaphragm snaps to a concave-upward condition and raises the center portion 86 against the sleeve 44. Upon cooling, the diaphragm snaps in again but the original spring in the bellows holds the valve closed. Creation of a partial vacuum in the casing and the maintenance of atmospheric pressure in the bellows (due to the hollow valve 58, sleeve 44 and openings 68) tend to expand the bellows but this is limited by the abutment 74. The sleeve 44 prevents undue collapse of the bellows due either to steam pressure or water pressure.

In Figure 9, the lowest convolution or flange 82 on the bellows is soldered to a disc or plate 100 having three or more spaced lugs 101 guiding and centering the bellows in the casing. The plate has a concavity 102 whose center is spaced a little from the sleeve 44. The plate rests on a snap disc or diaphragm 104 which is initially concave upwardly and has a flange soldered to the member 30. The member 30 has a flaring bottom wall 106 whose center is provided with a little hollow projection through which a volatile fluid is inserted. The opening is plugged by a centering pin 108 soldered to a washer 110 which is in turn soldered to the bottom wall 106. The pin is centered in an opening in a hollow screw 112 which is adjustably threaded in the boss on the valve base 10. When the predetermined temperature is reached, the volatile fluid vaporizes and snaps the diaphragm 104 upwardly. This raises the concavity 102 against the sleeve 44 and insures the closing of the valve.

The bellows is always open to the atmosphere as in Fig. 8 and will tend to expand when a partial vacuum is created in the system.

When once the air has ben expelled from the valve casing in any of these forms, there is no further occasion for the valve to open and it remains closed. When the system cools down, the closed valve maintains a vacuum. Upon subsequent heating, steam is admitted to the valve without any waste of power and heat in driving out air. Steam pressure cannot open the valve because such steam first operates the thermostatic snap member which takes up the lost motion space between the sleeve 44 and valve 58 (Figs. 1, 6 and 7) or between the sleeve 44 and the stiffening plates of Figs. 8 and 9 whereby a strong compressive member (the sleeve 44) positively limits the collapse of the bellows.

I claim:

1. In a device of the character indicated, in combination, a valve casing having a seat, a valve adapted to engage the seat, a container connected to the valve, a thermostatic snap member inside of the container, the valve being hollow to admit air to the container, and means passing through the valve for connecting the snap member to the casing.

2. In a device of the character indicated, in combination, a valve casing having a seat, a valve adapted to engage the seat, a container connected to the valve, the valve being hollow to admit air to the container, a thermostatic snap disc inside of the container, and means for transmitting the snap action of the disc from the casing to the valve.

3. In a device of the character indicated, in combination, a valve casing having a seat, a valve adapted to engage the seat, a container connected to the valve, a thermostatic snap member inside of the container, means for connecting the snap member to the casing, and a sleeve between the snap member and the valve.

4. In a device of the character indicated, a valve casing having a seat, a valve adapted to engage the seat, a bellows connected to the valve, a rod suspended from one end of the casing and passing through the valve into the bellows, a thermostatic snap member hung on the rod, and means for transmitting the snap action of the snap member to the valve.

5. In a device of the character indicated, a valve casing having a seat, a hollow valve adapted to engage the seat, a bellows connected to the hollow valve, a rod suspended from one end of the casing and passing through the valve into the bellows, a thermostatic snap member and a plate hung on the rod, and means for transmitting the snap action of the snap member from the plate to the valve.

6. In a device of the character indicated, a valve casing having a seat, a hollow valve adapted to engage the seat, a collapsible container having connection with the valve and being open to the outside of the casing through the hollow valve, a thermostatic snap member inside the container, means for suspending the snap member from one end of the casing, and means for transmitting the snap action of the snap member to the valve.

7. In a device of the character indicated, a valve casing having a valve seat, a hollow valve adapted to engage the seat, a container having connection with the valve, a thermostatic snap member and a plate inside of the container, means for suspending the snap member and the plate from one end of the casing, and a sleeve for transmitting the snap of the snap member from the plate to the valve; substantially as described.

8. In a device of the character indicated, a valve casing having a seat, a hollow valve adapted to engage the seat, a bellows connected to the hollow valve, a thermostatic snap member inside of the bellows, a stiffening plate engaging the snap member, and means for suspending the snap member from the casing.

9. In a device of the character indicated, in combination, a valve casing having a round opening, and a drain pipe having its outer surface fitting said round opening for at least 180° but less than 360°.

10. In a device of the character indicated, a valve casing having a seat, a hollow valve adapted to engage the seat, an elastic container closed to the casing and connected to the hollow valve, a thermostatic snap member inside of the container, and means including a member extending into the interior of the elastic container for transmitting the snap action of the snap member from the casing to the valve; substantially as described.

11. In a steam radiator valve, a valve casing having a seat, a valve adapted to engage the seat, a bellows in the casing and connected to the valve, a bimetallic snap member responsive to heat and reacting between the casing and the valve for closing the valve, and means for entirely enclosing the bimetallic member away from corrosive matter in the valve casing.

12. In a steam radiator valve, a valve casing having a seat, a valve adapted to engage the seat, a bellows having connection with the valve, a thermostatic snap member responsive to heat for closing the valve, means for always admitting atmospheric air from outside the casing into the interior of the bellows, and means extending from the casing into the bellows for applying the reaction of the snap member in closing the valve.

13. In a device of the character indicated, in combination, a valve casing, a valve, a closed container shiftable in the valve casing, a thermostatic snap member entirely housed inside of the shiftable container to protect the snap member from corrosion, and means for transmitting the snap action of the snap member to the valve.

14. In a device of the character indicated, in combination, a valve casing having a seat, a valve adapted to engage the seat, a container connected to the valve, a bimetallic snap disc, the valve being hollow to admit a support for the snap disc, means extending through the hollow valve for connecting one portion of the disc to the casing, and means for transmitting the snap action of the snap disc to the valve.

15. In a device of the character indicated, a valve casing having an opening, a drain pipe passing through the opening but leaving the opening unobstructed for approximately its semi-diameter, and the drain pipe having its outer surface conforming to other portions of the opening.

HAROLD R. GOODALE.